United States Patent
Song et al.

(10) Patent No.: US 6,529,677 B2
(45) Date of Patent: Mar. 4, 2003

(54) METHOD FOR FORMATTING THE FACET OF OPTICAL WAVEGUIDE ELEMENT FOR USE IN OPTICAL COMMUNICATION

(75) Inventors: Hyun-Chae Song, Inchonkwangyokshi (KR); Tae-Hyung Rhee, Kyonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/741,235

(22) Filed: Dec. 20, 2000

(65) Prior Publication Data

US 2001/0005441 A1 Jun. 28, 2001

(30) Foreign Application Priority Data

Dec. 24, 1999 (KR) .......................................... 99-61597

(51) Int. Cl.[7] .................................................. G02B 6/00
(52) U.S. Cl. ..................................................... 385/147
(58) Field of Search ........................... 385/14, 80, 131, 385/147

(56) References Cited

U.S. PATENT DOCUMENTS

| | | | | |
|---|---|---|---|---|
| 5,006,285 A | * | 4/1991 | Thackara et al. | 264/1.3 |
| 5,331,657 A | * | 7/1994 | Yoo et al. | 372/46 |
| 5,703,980 A | * | 12/1997 | MacElwee et al. | 385/49 |
| 6,210,867 B1 | * | 4/2001 | You et al. | 430/321 |
| 6,298,192 B1 | * | 10/2001 | Yoo et al. | 385/137 |

* cited by examiner

*Primary Examiner*—Javaid Nasri
(74) *Attorney, Agent, or Firm*—Steve Cha; Cha & Reiter

(57) ABSTRACT

Disclosed is a method for formatting facets of an optical waveguide element. The method according to the present invention includes the steps of: (1) attaching auxiliary blocks so they are protruded from the upper portions of both ends of the optical waveguide element by a means of an adhesive coupling, and coating with the adhesive from the bottom of the protruded auxiliary blocks to the end facets of the core and the cladding layer of the optical waveguide element; (2) contacting the auxiliary blocks with a thermal plate, which has undergone an optical facial treatment, so that the facets of the optical waveguide element, including the auxiliary blocks formed in the first step can be shaped into a predetermined oblique angle; (3) applying pressure on the optical waveguide element including the auxiliary blocks in a downward direction against the thermal plate until the adhesive coated on the facets of the optical waveguide element is completely melted; (4) moving the optical waveguide element including the auxiliary blocks in a horizontal direction along the thermal plate at the moment when the adhesive coated on the facets of the optical waveguide element including the auxiliary blocks is completely melted; and, (5) removing the optical waveguide element including the auxiliary blocks from the thermal plate at the moment when the adhesive coated on the facets of the optical waveguide element including the auxiliary blocks is completely removed.

15 Claims, 8 Drawing Sheets

METHOD FOR FORMATTING THE FACET OF OPTICAL WAVEGUIDE ELEMENT FOR USE IN OPTICAL COMMUNICATION

CLAIM OF PRIORITY

This application makes reference to and claims all benefits accruing under 35 U.S.C. Section 119 from an application entitled, "Method for Formatting Facet of Optical Waveguide Element", filed with the Korean Industrial Property Office on Dec. 24, 1999 and there duly assigned Serial No. 99-61597.

BACKGROUND OF THE INVENTION

1. Field of the Invention

The present invention relates to an optical waveguide element, and more particularly to a method for formatting the facets of an optical waveguide element for use with optical communication.

2. Description of the Related Art

In general, the entire process of manufacturing an optical waveguide element comprises the following steps: forming an optical waveguide element including a core layer and a cladding layer by laminating film on the upper substrates of the layers; dicing to cut the optical waveguide element in an appropriate length for packaging; and, formatting the facets of the optical waveguide for use with optical communication.

Since the facet-formatting process is required to enhance the efficiency of combining the optical waveguide element and optical fiber, the expense and time incurred for the facet-formatting operation are a considerably important part of an optical fabrication process. One of the methods used in the conventional facet-formatting process is directed to the fine processing of an object under low pressure by rubbing the object to a desired form. The facet-formatting process employs an abrasive method for rubbing the facet of an optical waveguide element on a sand paper or other alternative abrasive materials. Polishing and lapping are some of the abrasive methods. The lapping technique incorporates a lap, which is a rotatable disc consisting of a soft material, such as cast iron, copper, or wood, to polish the subject element by moving the lap device against the subject element, while introducing a lapping material, which is an abrasive liquid, between the lap device and the subject element. There are different degrees of hardness used for the lapping materials, which is listed in the following order: diamond; SiC, $Al_2O_3$, etc.

Figure 1:
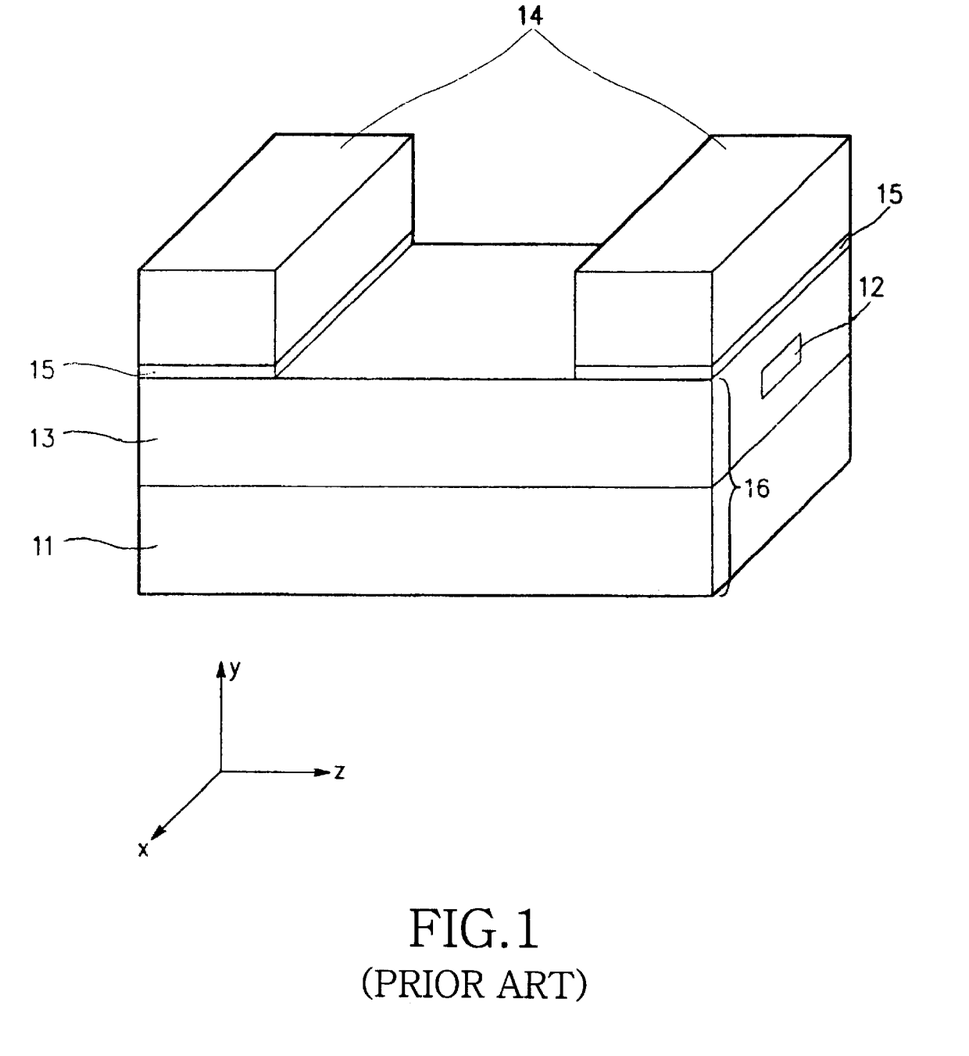
FIG. 1 is a perspective view illustrating the conventional polymer optical waveguide element and auxiliary blocks.

FIG. 1 is a perspective view of the conventional polymer optical-waveguide element with the auxiliary blocks mounted thereto. FIG. 1 shows the substrate layer 11 composed of a material, such as silicon, glass or melted silica, and the core layer 12 and a cladding layer 13 laminated on the upper portion of the substrate layer 11. Two auxiliary blocks 14 are fixed onto both ends of the upper portion of the cladding layer 13 through the adhesive coupling 15. The auxiliary blocks 14 are positioned at both ends of the polymer optical waveguide element 16. The function of auxiliary blocks 14 is to protect the film of the polymer optical waveguide 16 when the optical waveguide element 16 is attached to an instrument, such as a jig, etc., during the abrasion operation. The auxiliary blocks 14 serve to enhance the adhesivity of the polymer optical waveguide element 16 to other elements adhered thereto by widening the adhering area.

Figure 2:
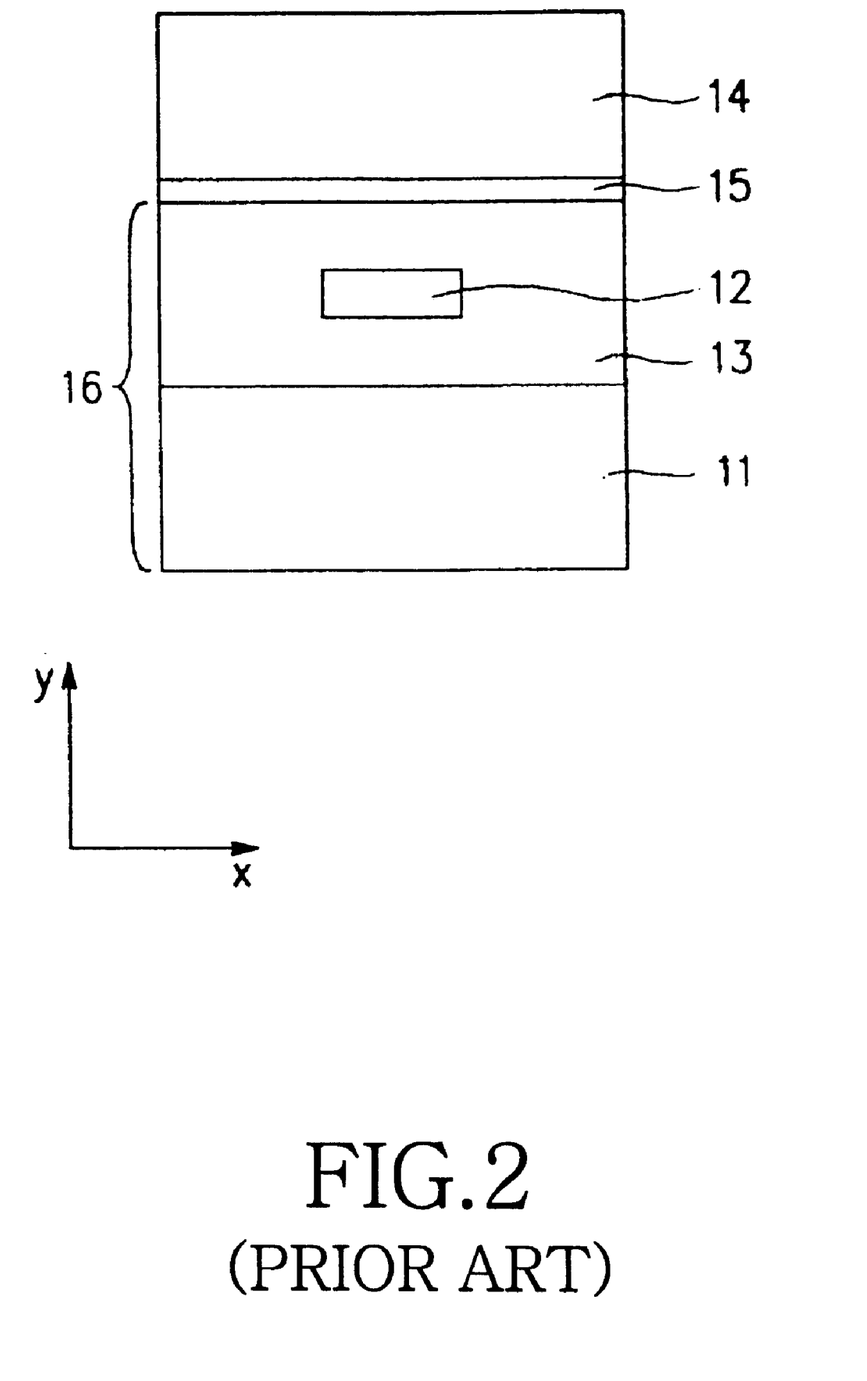
FIG. 2 is a side view illustrating the facets of a polymer optical waveguide element and the auxiliary blocks shown in FIG. 1.

FIG. 2 is a side view illustrating the facets of the polymer optical waveguide element 16 and the auxiliary blocks 14 shown in FIG. 1. The polymer optical waveguide element 16 and the auxiliary blocks 14 have two ends of facets for adhering to optical fibers or other optical elements. FIG. 2 is a simplified block diagram showing one side of the facets. On the surface of the facet, the portion requiring fine optical processing is near the core region 12 and the cladding layer region. The reason is because an optical signal is inputted to or outputted from the polymer optical waveguide element 16 along the core layer 12. The cladding layer 13 allows the optical signal transmission to travel within the core layer 12. The substrate 11 and the auxiliary blocks 14 have no functional structure for the transmission of the optical signal.

Figure 3:
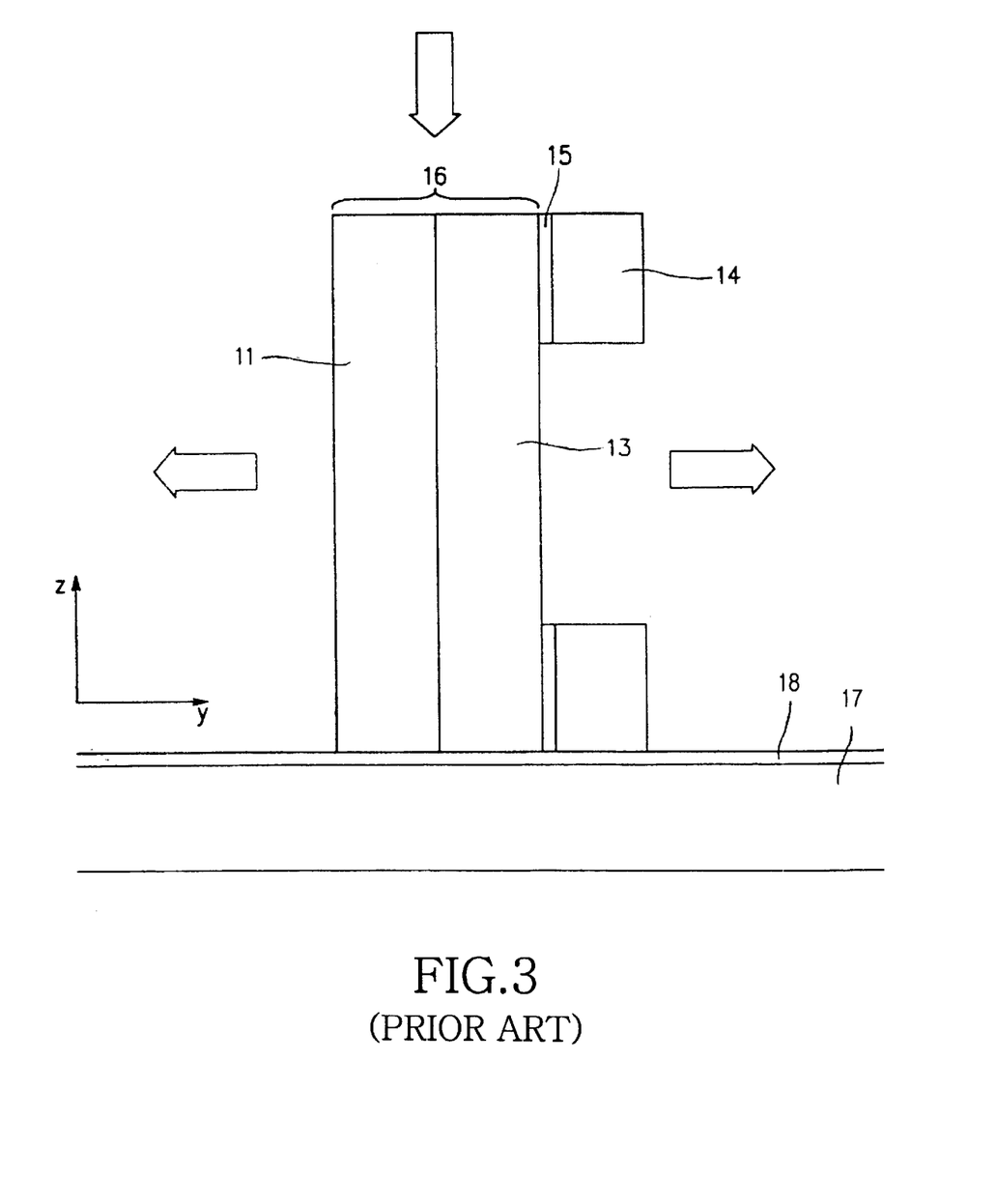
FIG. 3 is a diagram illustrating a method for formatting the facets of the polymer optical waveguide element shown in FIG. 1.

FIG. 3 is a diagram showing the conventional method of formatting the facets of the polymer optical waveguide element 16 shown in FIG. 1. The auxiliary blocks 14 and the polymer optical waveguide element 16 are fixed onto an instrument, i.e., a jig and other alternative holding devices, for polishing one of the facets. One end of the facet is in contact with the upper surface of the plain abrasive material 17. Here, a predetermined pressure is pushed downward at the opposite facet of the one being polished so that the contact surface between the polymer optical waveguide element 16 and the abrasive material 17 can be tightened. Such pressure in a vertical direction is maintained during the abrasive processing. During the abrasion process, the abrasive liquid 18 is introduced between one end of the polymer optical waveguide element 16 and the surface of the abrasive material 17. The abrasive liquid 18 consist of micro-size particles, such as $Al_2O_3$. Thus, the level of the abrasive processing of the facet is controlled by varying the size of particles contained in the abrasive liquid 18. Accordingly, an abrasive liquid 18 having a particle size of several decimal um is used at the beginning of the abrasive processing, while an abrasive liquid 18 having a particle size of several $\mu$m is used in the middle of the abrasive processing, and an abrasive liquid 18 having a particle size less than 1 $\mu$m is used toward the end. The problem posed by this kind of facet processing method is time-consuming processing due to the abrasion of changing the abrasive liquid 18 in each step.

SUMMARY OF THE INVENTION

It is, therefore, an object of the present invention to provide a method for formatting the facets of an optical waveguide element capable of reducing the processing time in the prior art system.

To achieve the above and other objects of the present invention, there is provided a method for formatting the facets of an optical waveguide element including a core laminated on the upper surface of a substrate layer and a cladding layer, comprising the steps of: (1) attaching auxiliary blocks on the top of the optical waveguide element so that the auxiliary blocks are protruding from both ends of the optical waveguide element and coated with the adhesive from a bottom of the protruded auxiliary blocks to the facets of the core and cladding layers of the optical waveguide element; (2) contacting the auxiliary blocks with a thermal plate, which has undergone an optical facial treatment, so that the facets of the optical waveguide element including the auxiliary blocks formed in the first step can make a predetermined angle in an inclined relationship to a direction of a normal to the thermal plate; (3) applying a pressure on the optical waveguide element including the auxiliary blocks in a direction normal to the thermal plate until the adhesive coated on the facets of the optical waveguide element is completely melted; (4) of moving the optical waveguide element including the auxiliary blocks in a direction horizontal to the thermal plate at the moment when the adhesive coated on the facets of the optical waveguide element including the auxiliary blocks is completely melted; and, (5) removing the optical waveguide element including the auxiliary blocks away from the thermal plate at the moment when the adhesive coated on the facets of the optical waveguide element including the auxiliary blocks is completely removed.

BRIEF DESCRIPTION OF THE DRAWINGS

The above objects, features, and advantages of the present invention will become more apparent from the following description when taken in conjunction with the accompanying drawings, in which.

DETAILED DESCRIPTION OF THE PREFERRED EMBODIMENTS

The preferred embodiments of the present invention will be described herein below with reference to the accompanying drawings. For the purpose of clarity, well-known functions or constructions are not described in detail as they would obscure the invention with unnecessary detail.

Figure 4:
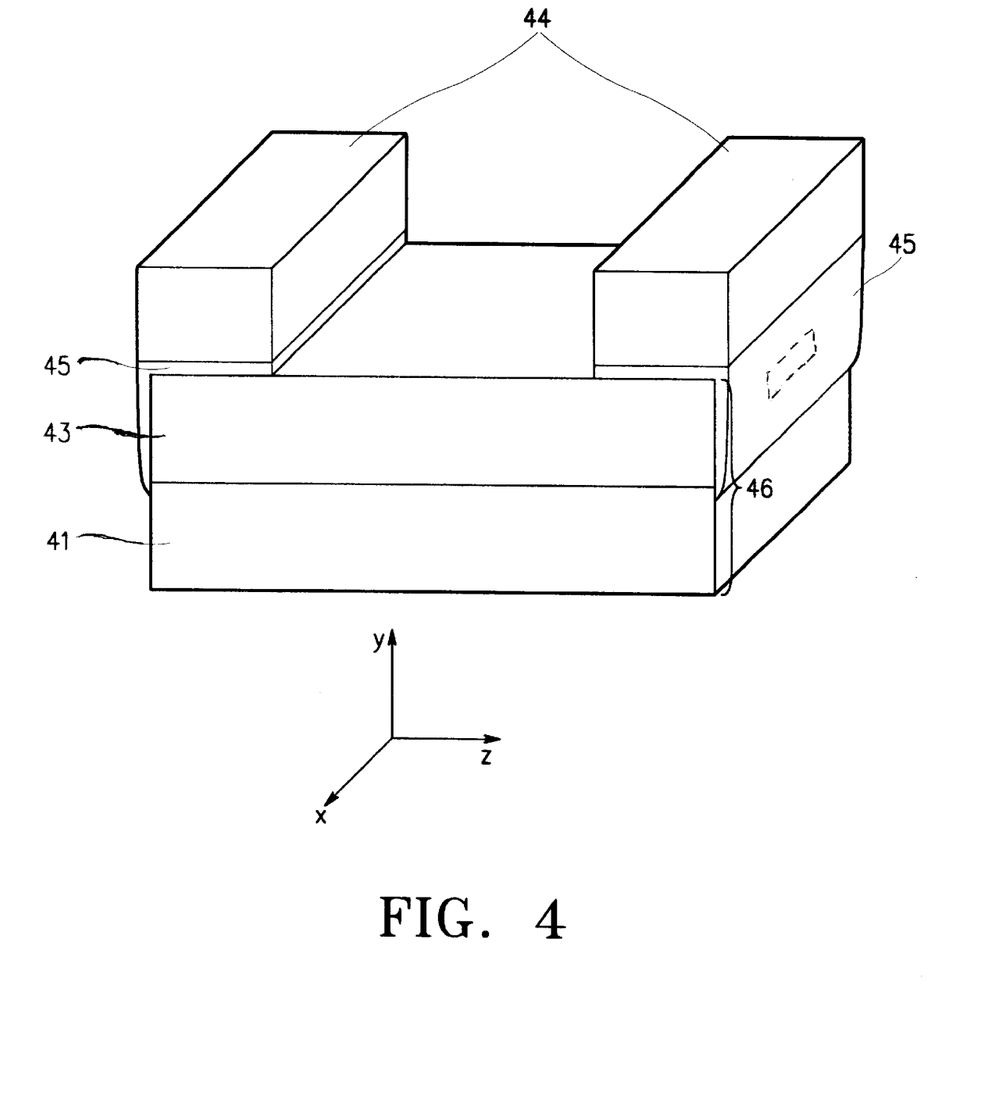
FIG. 4 is a perspective view illustrating a polymer optical waveguide element including auxiliary blocks according to a preferred embodiment of the present invention.

FIG. 4 is a perspective view illustrating a polymer optical waveguide element including auxiliary blocks according to the preferred embodiment of the present invention. FIG. 4 shows a substrate 41 made of materials, such as silicon, glass, or melted silica, etc., and a core and cladding layer 43 laminated on the upper portion of the substrate 41.

The two auxiliary blocks 44 are mounted onto both ends of the upper portions of the cladding layer 43 through an adhesive coupling 45. As shown in FIG. 4, both ends of the auxiliary blocks are not alighted with the respective end surface of the optical waveguide element 46; rather, they are slightly protruded from the respective end surface of the optical waveguide element 46. As shown in FIG. 4, the adhesive coupling 45 covers from the bottom of the auxiliary blocks 44 and extends to each end of the core and cladding layer 43. The core and cladding layer 43, the auxiliary blocks 44, and the adhesive coupling 45 are composed of a thermally meltable polymer material, i.e., thermoplastic resin, poly-acrylic resin, etc. The material subject to the facet formatting of the optical waveguide element plays a very significant role in the present invention. In essence, the present invention utilizes thermally meltable materials for the adhesive coupling 45.

The method for formatting the facets according to the present invention mainly includes the steps of melting the facets of the optical waveguide element through thermal processing, and shaping the thermally processed facets corresponding to an optically-rubbed surface of a thermal plate or a supporting substrate.

Figure 5:
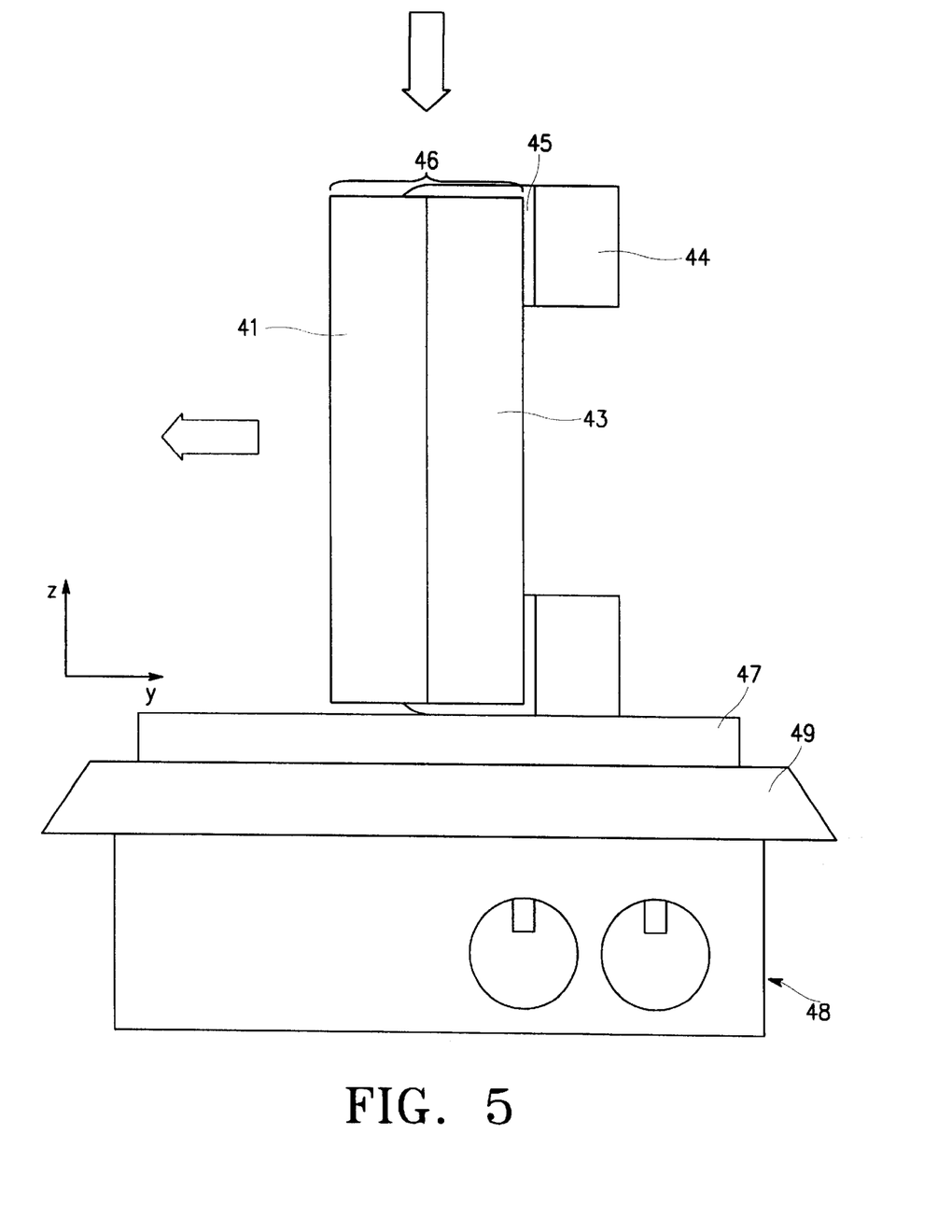
FIG. 5 is a diagram illustrating a method for formatting facets of the polymer optical waveguide element shown in FIG. 4.

FIG. 5 is a diagram illustrating the method for formatting the facets of the polymer optical waveguide element 46 shown in FIG. 4. The polymer optical waveguide element 46 including the auxiliary blocks 44 is placed on top of the heating device 48, which includes the thermal plate 49 and the supporting substrate 47 with an optically rubbed surface.

The polymer optical waveguide element 46, with the auxiliary blocks 44 attached thereto, is fixed onto an instrument, such as a jig for the preparation of a thermal processing. The facets to be thermally processed or the surface to be thermally processed are pushed against the upper surface of the supporting substrate 47. A predetermined pressure is pushed downward from the opposite facet against the supporting substrate 47 until the adhesive coupling 45 coated on the facet of the polymer optical waveguide element 46 is completely melted. Here, the temperature of the thermal plate 49 and the supporting substrate 47 heated by the thermal plate 49 are set to be higher than the melting point of the auxiliary blocks 44, the adhesive 45, or the core and cladding layer 43. At the moment when the adhesive coated on the facet of the polymer optical waveguide element 46 including the auxiliary blocks 44 is completed melted, the polymer optical waveguide element 46 including the auxiliary blocks 44 is moved horizontally in the y-axis direction to remove any melted residue left after the heat treatment.

Then, at the moment when the adhesive 45 coated on the facet of the polymer optical waveguide including the auxiliary blocks 44 is completely removed, the polymer optical waveguide element 46 including the auxiliary blocks 44 is lifted up from the supporting substrate 47. By undergoing the above process, the thermally processed facet end of the polymer optical waveguide element 46 is shaped similar to the optically polished surface of the supporting substrate 47. When coupling an input light to an optical device, the surface roughness of a facet has to be flat and polished to reduce the coupling loss. To this end, a process of polishing the facet of the optical device is performed in the prior art. However, the present invention can obtain the same optically polished surface through a thermally melted process operated on the surface of a substrate with a previously polished surface, such as a silicon wafer. Accordingly, the thermal plate already has an optically processed surface of a silicon material.

Figure 6:
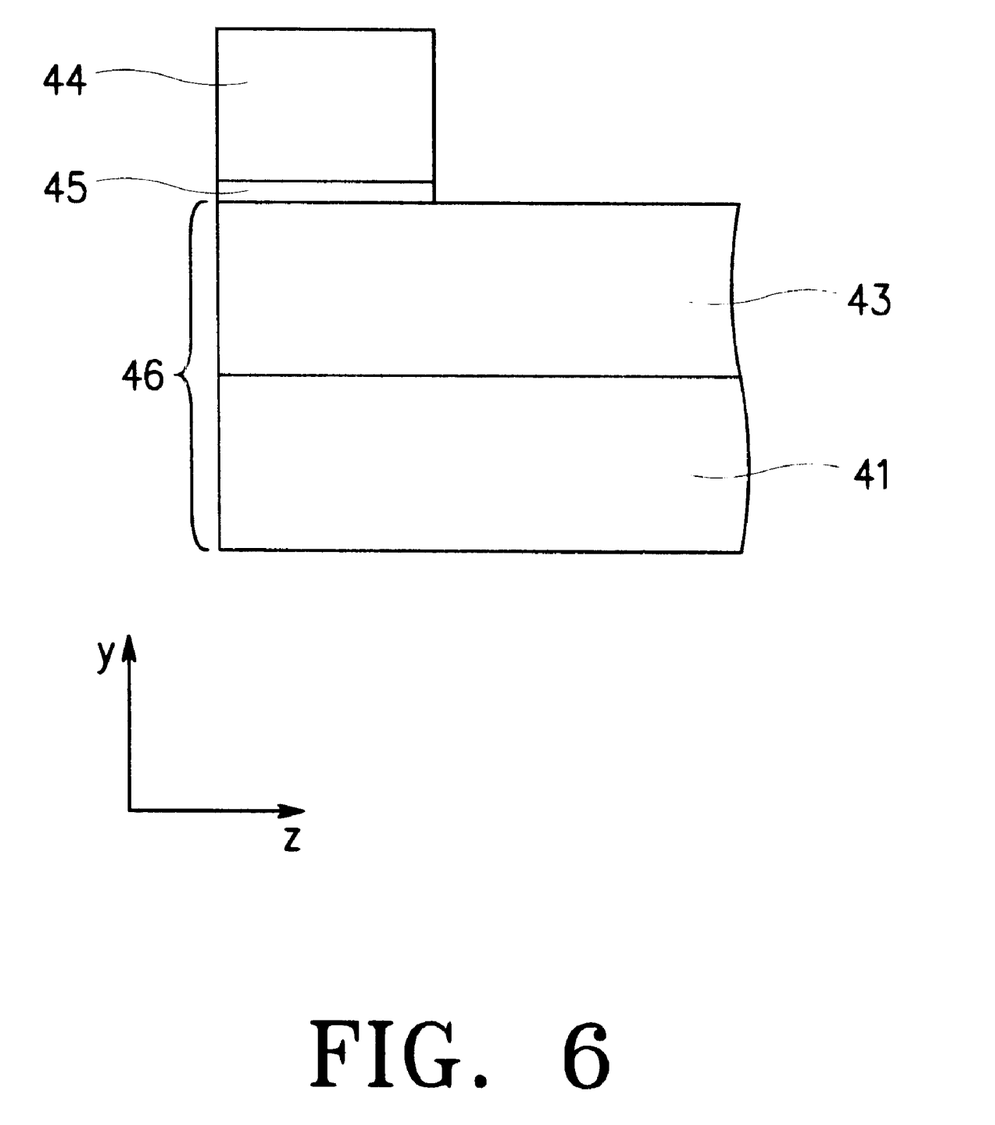
FIG. 6 is a perspective view of the polymer optical waveguide element including auxiliary blocks and the facets of which have been formatted by the device shown in FIG. 5.

As described above, the method for formatting the facets of the optical waveguide element according to the present invention is achieved by formatting the facets of the optical waveguide element through a thermal melting operation. FIG. 6 is a perspective view of the polymer optical waveguide element including auxiliary blocks, the facets of which have been formatted by the device shown in FIG. 5.

As shown in FIG. 6, the adhesive 45, coated from the bottom of the protruded auxiliary blocks 44 to the end of the core and the cladding layer 43 of the polymer optical waveguide element 46, is completely removed through a thermal melting operation according to the present invention.

Figure 7:
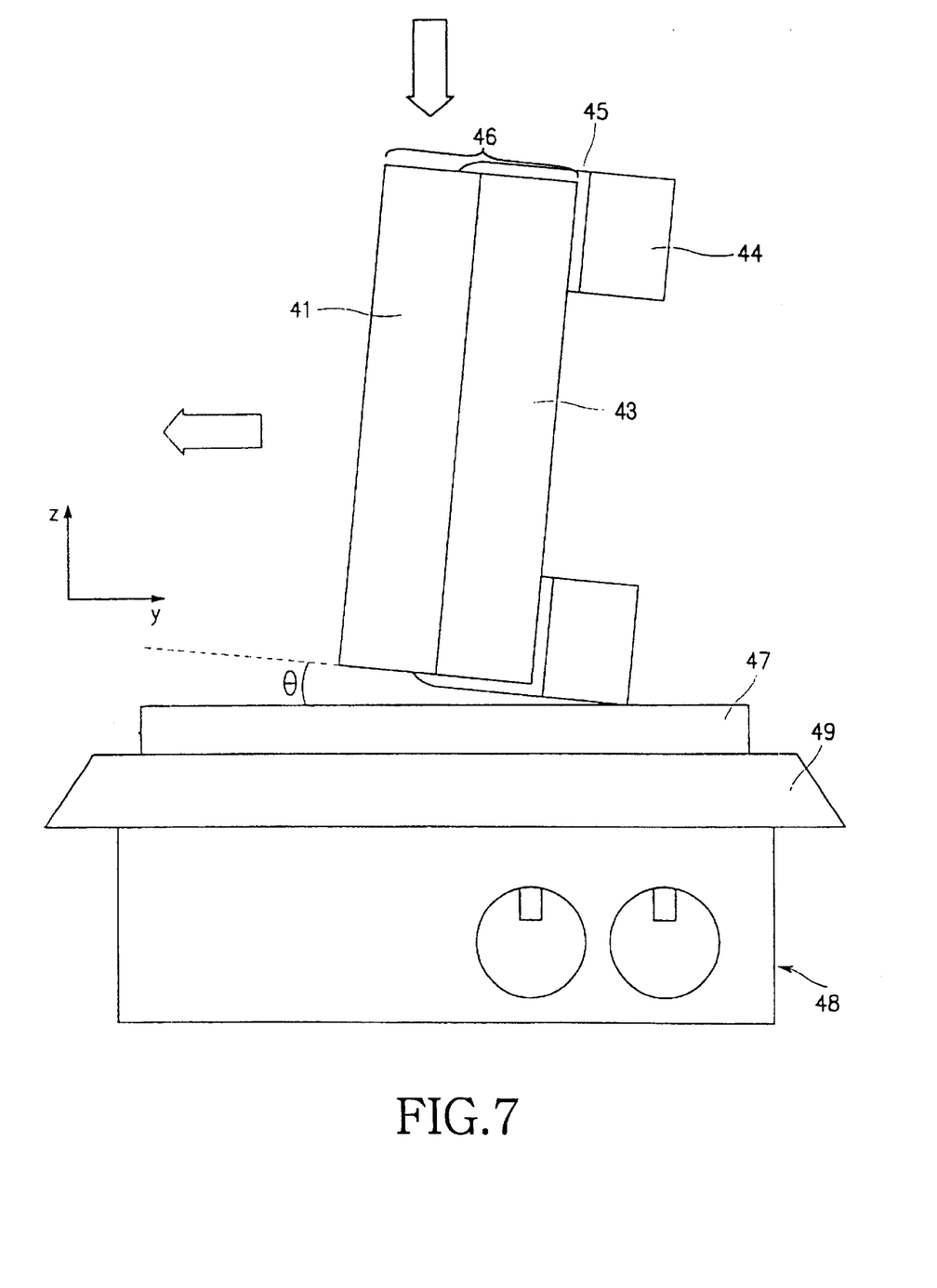
FIG. 7 is a diagram illustrating a method for formatting facets of the polymer optical waveguide element according to another preferred embodiment of the present invention; and, FIG. 8 is a perspective view of the polymer optical waveguide element including auxiliary blocks and the facets of which have been formatted by the device shown in FIG. 7.

FIG. 7 is a diagram illustrating a method for formatting the facets of the polymer optical waveguide element according to another preferred embodiment of the present invention. FIG. 7 shows the polymer optical waveguide element 46 including the auxiliary blocks as shown in FIG. 4, and the same heating device, including the thermal plate 49 and the supporting substrate 47 having an optically rubbed surface.

The method for formatting the facets to be described herein below is similar to the earlier embodiment of the present invention, except that the supporting substrate 47 is in contact with the thermal plate 49 so that the facets of the polymer optical waveguide element 46 including the auxiliary blocks 44 have a predetermined angle θ with respect to the normal direction to the end facet of the element 46. For example, an angle of 8 degrees is selected arbitrarily. Thus, in the second embodiment of the present invention, the end facet of the optical waveguide element 46 is shaped in an inclined relationship to the direction normal to the end facet of the element 46.

During a shaping process, a predetermined pressure is pushed onto the polymer optical waveguide element 46 including the auxiliary blocks 44 in a downward direction against the surface of the auxiliary substrate 47. At the moment when the adhesive 45 is completely melted, the polymer optical waveguide element 46 including the auxiliary blocks 44 is moved toward a direction horizontal (y-axis) to the auxiliary substrate 47. Thereafter, when the adhesive 45 coated on the facet of the polymer optical waveguide including the auxiliary blocks 44 is completely removed, the polymer optical waveguide element 46 including the auxiliary blocks 44 is moved away from the surface of the supporting substrate 47.

Figure 8:
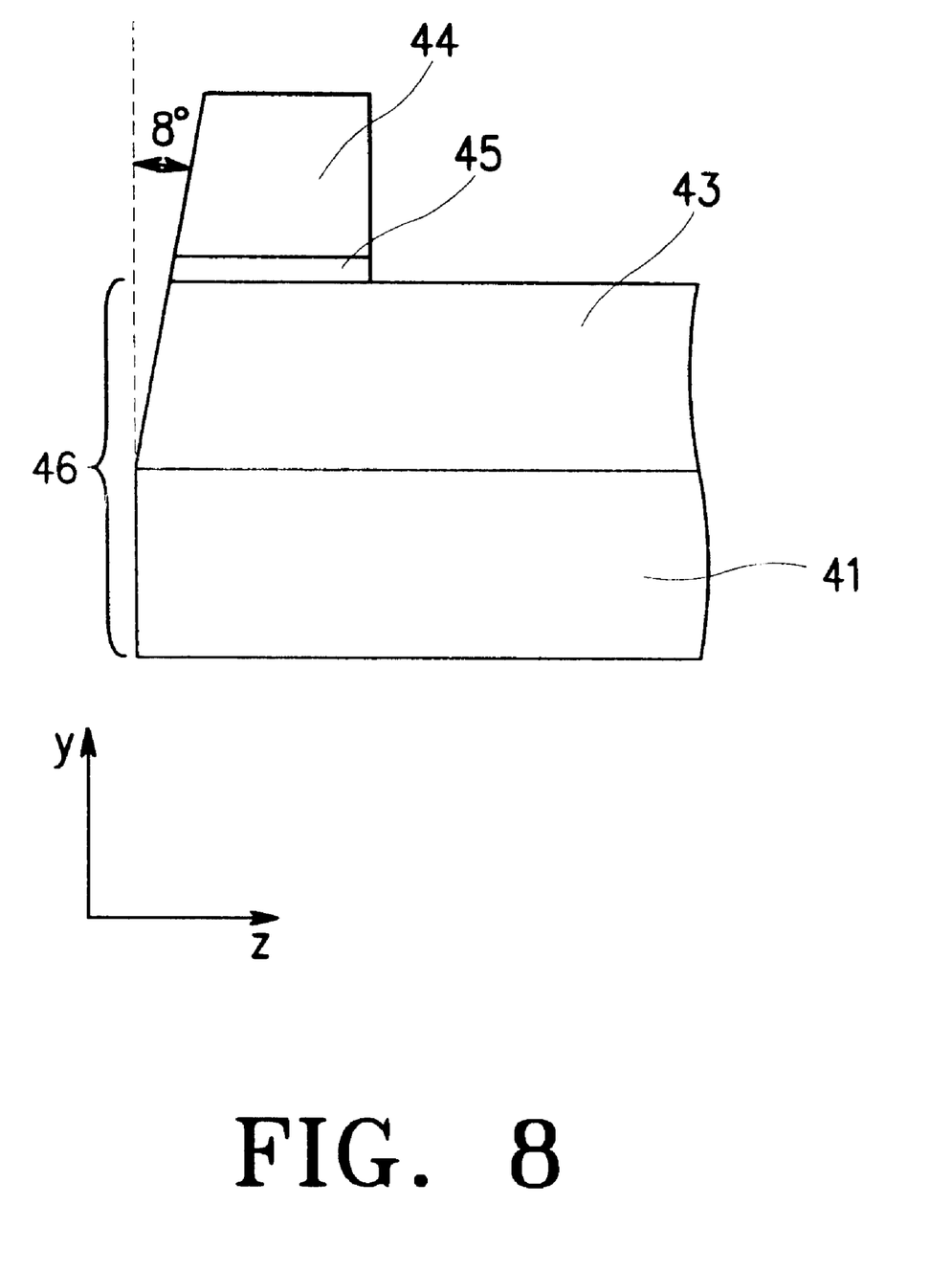

FIG. 8 is a perspective view of the polymer optical waveguide element 46 including the auxiliary blocks 44, the facets of which have been formatted by the device shown in FIG. 7. FIG. 8 shows the removal of the adhesive 45 coated from the bottom of the protruded auxiliary blocks 44 to the core and cladding layer 43 of the polymer optical waveguide element 46 through a thermal processing according to the present invention. The facet of the polymer optical waveguide element 46 including the auxiliary blocks 44 was tapered at an angle of 8 degrees.

In summary, the method for formatting facets of the optical waveguide element according to the present invention has the following characteristic features. Unlike the conventional method which used an abrasion of the facets of the optical waveguide element, the method according to the present invention uses a thermal processing to treat the end facet.

As described above, the method for formatting the facets of the optical waveguide element has an advantage in reducing the processing time by combining all necessary steps in the prior art into a single thermal processing operation to achieve the same result. The method for formatting facets of the polymer optical waveguide element also has an advantage in covering the facet formatting with a single thermal processing.

While the invention has been shown and described with reference to certain preferred embodiments thereof, it will be understood by those skilled in the art that various changes in form and detail may be made therein without departing from the spirit and the scope of the invention as defined by the appended claims.

What is claimed is:

1. A method for formatting the facets of an optical waveguide element, which includes a substrate, a core and a cladding layer laminated on an upper portion of said substrate, comprising the steps of:

attaching a pair of auxiliary blocks spaced apart on a top surface of the optical waveguide element through adhesive coupling, said auxiliary blocks protruding outwardly from both end facets of said optical waveguide element, said adhesive coupling substantially covering a bottom surface of respective said protruded auxiliary blocks extending to the end facets of said core and cladding layer of said optical waveguide element;

applying one end of said optical waveguide element and said auxiliary block against a thermal plate having the characteristics of an optical polished surface;

applying a pressure on said optical waveguide element in a downward direction until said adhesive coupling in contact with said thermal plate is completely melted;

relocating said optical waveguide element along said thermal plate in a horizontal direction while maintaining the contact with said thermal plate; and, removing said optical waveguide element from said relocated position along said thermal plate when said adhesive coupling on the end facet of said optical waveguide element is completely removed.

2. The method of claim 1, wherein said auxiliary blocks, said adhesive coupling, said core and cladding layer are comprised of thermally meltable polymer materials.

3. The method of claim 2, wherein the temperature of said thermal plate is substantially higher than the melting point of said polymer materials.

4. The method of claim 1, wherein said optical waveguide element and said auxiliary block against said thermal plate are in a predetermined, inclined relationship to a direction normal to the end facet of said optical waveguide element.

5. The method of claim 1, wherein said substrate is comprised of silicon, glass or meltable silica materials.

6. The method of claim 1, wherein said thermal plate has an optically processed surface of a silicon material.

7. The method of claim 2, wherein said substrate is comprised of silicon, glass or meltable silica materials.

8. The method of claim 2, wherein said thermal plate has an optically processed surface of a silicon material.

9. A method for forming an optical waveguide, comprising the steps of:

preparing said optical waveguide by forming a core and cladding layer on the surface of a substrate;

forming a pair of coupling blocks spaced apart on a top surface of said optical waveguide separated by an adhesive coupling, said coupling blocks protruding outwardly from the respective end facets of said optical waveguide, said adhesive coupling covering a bottom of said coupling blocks and both end facets of said core and cladding layer;

applying one end of said optical waveguide against a thermal plate position in a horizontal orientation;

applying a pressure on said optical waveguide in a downward direction until said adhesive coupling in contact with said thermal plate is completely melted;

relocating said optical waveguide along said thermal plate in a horizontal direction while maintaining the contact with said thermal plate; and, removing said optical waveguide from said relocated position when said adhesive coupling on the end facet of said optical waveguide element is completely removed.

10. The method of claim 9, wherein said thermal plate has an optical rubbed surface characteristics.

11. The method of claim 9, wherein said coupling blocks, said adhesive coupling, said core and cladding layer are comprised of thermally meltable polymer materials.

12. The method of claim 11, wherein the temperature of said thermal plate is substantially higher than the melting point of said polymer materials.

13. The method of claim 9, wherein said optical waveguide and said coupling block against said thermal plate are in a predetermined, inclined relationship to a direction normal to the end facet of said optical waveguide.

14. The method of claim 9, wherein said substrate is comprised of silicon, glass or meltable silica materials.

15. The method of claim 9, wherein said thermal plate has an optically processed surface of a silicon material.

* * * * *